(12) United States Patent
Wilson et al.

(10) Patent No.: US 6,501,890 B1
(45) Date of Patent: Dec. 31, 2002

(54) HEAT STRIPPABLE OPTICAL FIBER RIBBONS

(75) Inventors: Daniel A. Wilson, Cincinnati, OH (US); Paul J. Shustack, Elmira, NY (US); Camille J. Rechel, Cincinnati, OH (US)

(73) Assignee: Borden Chemical, Inc., Columbus, OH (US)

( * ) Notice: Subject to any disclaimer, the term of this patent is extended or adjusted under 35 U.S.C. 154(b) by 0 days.

(21) Appl. No.: 09/807,155

(22) PCT Filed: Aug. 9, 2000

(86) PCT No.: PCT/US00/21768
§ 371 (c)(1),
(2), (4) Date: Aug. 17, 2001

(87) PCT Pub. No.: WO01/11406
PCT Pub. Date: Feb. 15, 2001

Related U.S. Application Data

(60) Provisional application No. 60/147,881, filed on Aug. 9, 1999.

(51) Int. Cl.$^7$ ................................................. G02B 6/44
(52) U.S. Cl. ........................................ 385/114; 385/115
(58) Field of Search ................................. 385/114, 115

(56) References Cited

U.S. PATENT DOCUMENTS

| | | | |
|---|---|---|---|
| 5,561,730 A | 10/1996 | Lochkovic et al. | 385/114 |
| 5,761,363 A | 6/1998 | Mills | 385/114 |
| 5,881,194 A | 3/1999 | Duecker | 385/115 |
| 6,334,016 B1 * | 12/2001 | Greer, IV | 385/114 |

FOREIGN PATENT DOCUMENTS

| | | | | |
|---|---|---|---|---|
| EP | 636913 A | 2/1995 | | G02B/6/44 |
| EP | 992465 A | 4/2000 | | |
| EP | 1065547 A1 * | 1/2001 | | G02B/6/44 |
| WO | 9718493 A | 5/1997 | | |

* cited by examiner

*Primary Examiner*—Brian Healy
*Assistant Examiner*—Kevin S Wood
(74) *Attorney, Agent, or Firm*—Dinsmore & Shohl LLP

(57) ABSTRACT

Optical fiber ribbons comprise at least two optical fibers and a matrix material in which the optical fibers are encapsulated. The matrix material exhibits a maximum tensile strength at 100° C. of at least about 1000 psi and an elongation at break at 100° C. of at least about 15%, and the ribbons are easily and cleanly heat strippable in an intact unit to allow fiber splicing.

19 Claims, 1 Drawing Sheet

HEAT STRIPPABLE OPTICAL FIBER RIBBONS

This application claims the benefit of Provisional Application No. 60/147,881, filed Aug. 9, 1999.

FIELD OF THE INVENTION

The present invention is directed to optical fiber ribbons containing radiation cured matrix materials and is directed to radiation cured materials suitable for use, inter alia, as matrix materials for optical fiber ribbons. The radiation cured matrix materials have an advantageous combination of physical properties, including good maximum tensile strength and good elongation at high temperatures and provide the optical fiber ribbons with improved heat strippability to allow clean and reliable splicing of the optical fibers.

BACKGROUND OF THE INVENTION

New optical fiber technologies are continually being developed to accommodate increasing demands for band width and other communication properties. Optical fiber ribbons have been developed to provide increased packing densities, improved accessibility and the like. In the U.S. telecommunications industry, 12-fiber ribbons have become a standard while in Japan, 8-fiber ribbons have commonly been employed. Optical fiber ribbons are disclosed, for example, in the Duecker U.S. Pat. No. 5,881,194, the Lochkovic et al U.S. Pat. No. 5,561,730 and the Hattori et al U.S. Pat. No. 5,524,164, and by McCreary et al, *International Wire and Cable Symposium Proceedings* (1998):432–439.

Generally, optical fiber ribbons comprise two or more optical fibers embedded and secured within a matrix material. The optical fibers often contain one primary coating, optionally with a secondary coating, or even further additional coatings, and are typically arranged in parallel relation substantially within a single plane to form a ribbon. Ribbon fibers provide a convenient means for splicing fibers as many fibers can be spliced at one time. Generally, to splice the fibers, the matrix material and fiber coatings must be stripped from the fibers which are to be spliced, without damaging the fibers. Thermal stripping tools are conventionally employed to heat the matrix material, for example to a temperature of about 90° C. to about 110° C., and strip it from a portion of the glass fibers. It is desirable to strip off the coatings in an intact tube form to avoid damage to the optical fibers and/or to avoid deposit of coating debris on the fibers.

Optical fiber ribbon splicing is commonly performed in the field, and, unfortunately, the quality of the stripping operation is operator-dependent owing to variables such as the amount of time the fiber ribbon is heated in the stripping tool and the amount of pressure which the operator exerts on the stripping tool. Accordingly, it is often difficult to obtain a clean strip of the ribbon without disintegration of the coatings and/or the matrix material, and some amount of coating debris typically remains on the optical fibers. Debris on the fibers can interfere with and prevent a clean splice, while attempts to remove such debris can result in fiber breakage. Past attempts to improve the strippability of optical fiber ribbons have focused on primary and/or secondary coating materials typically employed on the optical fibers, as well as strip test parameters, as report by Murata, et al., *International Wire and Cable Symposium Proceedings* (1997): 281–288, Botelho, *International Wire and Cable Symposium Proceedings* (1993); 566–569, and Mills, *International Wire and Cable Symposium Proceedings* (1992): 472–475. These studies among others in the industry generally resulted in improvements in cleanliness upon thermal stripping. However, a need still exists in the fiber optic cable industry for ribbons which reduce the dependence of strippability on such factors.

Accordingly, a need remains for providing improved optical fiber ribbons including a heat strippable matrix material which allows for clean stripping of material from the optical fibers, substantially independent of operator variability.

SUMMARY OF THE INVENTION

Accordingly, it is an object of the present invention to provide optical fiber ribbons, and particularly to provide optical fiber ribbons which are heat strippable. It is an additional object of the present invention to provide optical fiber ribbons which overcome disadvantages of the prior art. It is a more specific object of the invention to provide optical fiber ribbons which allow for clean heat stripping of material from the optical fibers and reliable splicing of the stripped fibers. It is a further object of the invention to provide radiation cured matrix materials for use, inter alia, in optical fiber ribbons.

These and additional objects are provided by the optical fiber ribbons and matrix materials of the present invention. More particularly, the invention is directed to optical fiber ribbons which comprise at least two optical fibers encapsulated within a radiation cured matrix material having an advantageous combination of physical properties, including good maximum tensile strength and good elongation at high temperatures. In a more specific embodiment, the matrix materials exhibit a maximum tensile strength at 100° C. of at least about 1000 psi and an elongation at break at 100° C. of at least about 15%. The present invention is also directed to radiation cured matrix materials, wherein the radiation cured matrix materials exhibit a maximum tensile strength at 100° C. of at least about 1000 psi and an elongation at break at 100° C. of at least about 15%.

The optical fiber ribbons according to the present invention are advantageous in that the matrix material and any underlying coatings are easily and cleanly heat strippable from the optical fibers in an intact unit and therefore allow for reliable splicing of the stripped fibers in the field, independent of operator variability. The matrix material also exhibits a good combination of mechanical and chemical properties which are otherwise necessary for encapsulating and protecting the optical fibers within the ribbon structure.

These and additional objects and advantages provided by the optical fiber ribbons and matrix materials of the present invention will be more fully apparent in view of the following detailed description.

BRIEF DESCRIPTION OF THE DRAWING

The following detailed description will be more fully understood in view of the drawing which sets forth one embodiment of the optical fiber ribbons of the invention comprising four optical fibers encapsulated within a radiation cured matrix material.

DETAILED DESCRIPTION

Figure 1:
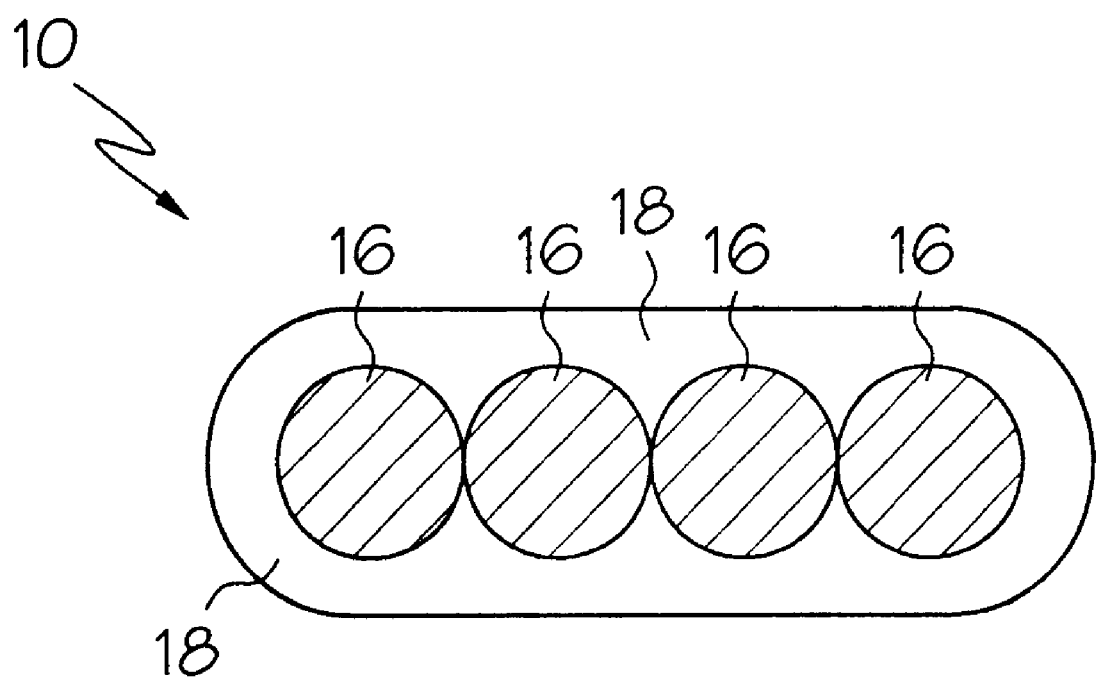

The present invention is directed to optical fiber ribbons and to radiation cured matrix materials for use, inter alia, in optical fiber ribbons. The optical fiber ribbons according to the present invention include at least two optical fibers encapsulated within a radiation cured matrix material. The optical fiber ribbons may comprise two, three, four, or more optical fibers as is desired for a particular application. While ribbons comprising four, eight and twelve optical fibers, respectively, are commonly employed, the number of optical fibers in a particular ribbon may be varied as desired.

Typical optical fiber ribbons in accordance with the present invention are shown in the FIGURE which illustrates an optical fiber ribbon 10. The ribbon 10 comprises four optical fibers 16 embedded within matrix material 18. As is known in the art, the ribbon may comprise subunits, wherein each subunit comprises two or more optical fibers, if desired. Typically, the optical fibers in the optical fiber ribbons of the present invention are arranged in parallel fashion and substantially within a single plane as shown in the FIGURE. However, it is equally within the scope of the present invention to arrange the optical fibers in other configurations as desirable.

The structure, composition and manufacture of the individual optical fibers 16 is well known in the art. The optical fibers may comprise, for example, a glass core and a glass cladding layer. The core, for example, may comprise silica doped with oxides of germanium or phosphorous and the cladding, a pure or doped silicate such as a fluorosilicate. Alternately, the fibers may comprise a polymer clad silica glass core. Examples of such polymer claddings include organosiloxanes such as polydimethylsiloxane or a fluorinated acrylic polymer. The optical fibers may be provided with one or more primary coatings and/or secondary coatings in accordance with techniques known in the art to protect the underlying glass fiber from external damaging forces and/or to improve the performance of the optical fibers. Additionally, the optical fibers may include ink coloring as desired. In a preferred arrangement, each fiber of a ribbon or a subunit ribbon is provided with a different and distinguishing color.

In accordance with an important feature of the optical fiber ribbons of the present invention, the matrix material 18 has a unique combination of advantageous properties which allow the optical fibers to be easily and cleanly heat stripped using conventional stripping tools, substantially independent of operator variability. Specifically, the matrix material exhibits both a maximum tensile strength at 100° C. of at least about 1000 psi and an elongation at break at 100° C. of at least about 15%, both of which properties are measured according to ASTM D-882–95a. These properties are measured once the material has been cured at about 70° C. Generally, the maximum tensile strength represents the peak of the stress-strain curve and often is equivalent to the tensile strength at break at higher temperatures, although for some materials in certain temperature ranges, break does not occur at the maximum tensile strength but at a subsequent, lower tensile strength.

The combination of the recited maximum tensile strength and elongation at 100° C. provides a robust matrix material with sufficient toughness and elongation to allow the matrix material and any underlying coatings to be cleanly removed from the optical fibers in a single unit over a wide range of temperatures, and particularly at commonly employed heat stripping temperatures of from about 90° C. to about 110° C. Matrix materials having the recited maximum tensile strength, typically as a result of high glass transition temperatures, but lacking the recited elongation, are usually brittle and therefore are not suitable for use in the present invention. Rather, the combination of both a maximum tensile strength at 100° C. of at least about 1000 psi and an elongation at break at 100° C. of at least about 15% are necessary to provide the improvements of the invention. In preferred embodiments, the maximum tensile strength at 100° C. is at least about 2000 psi, and more preferably is at least about 3000 psi, and the elongation at break at 100° C. is at least about 30%, and more preferably is at least about 40%. In further preferred embodiments, the maximum tensile strength at 100° C. is at least about 2000 psi and the elongation at break at 100° C. is at least about 30%. More preferably, the maximum tensile strength at 100° C. is at least about 3000 psi and the elongation at break at 100° C. is at least about 40%.

The matrix material comprises a radiation cured composition. Preferably, the matrix material is formed by curing a radiation curable composition comprising (a) aliphatic urethane oligomer having acrylate or methacrylate functionality, (b) reactive unsaturated monomer, and, optionally, (c) a photoinitiator.

The first component (a), the aliphatic urethane oligomer having acrylate or methacrylate functionality, is preferably a wholly aliphatic urethane acrylate oligomer. Preferably, the oligomer is based on an aliphatic polyether polyol, which is reacted with an aliphatic polyisocyanate and then acrylated or methacrylated to provide reactive terminal groups. Silicon-containing polyether polyol backbones are suitable. Alternatively, the oligomer may be based on any combination of polyol backbones which do not adversely affect the cured coating. Other suitable examples of backbones include hydrocarbon polyols, polycarbonate polyols, polyisocyanate polyols, and mixtures of these. However, polyether polyol backbones are preferred, because, in general, they have good hydrolytic stability and are relatively inexpensive. Polyols which are less suitable include polyester or epoxy backbones owing to yellowing and/or poor hydrolytic stability. The oligomeric component may contain very small amounts of urethane acrylates based on polyesters, but preferably contain only the above kinds of oligomers, for optimal long term stability.

A representative polyether polyol is based on a straight chain or branched alkylene oxide of from one to about twelve carbon atoms. The polyether polyol may be prepared by any method known in the art. Preferably, it has a number average molecular weight ($M_n$), as determined by vapor pressure osmometry, per ASTM D-3592, sufficient to give the entire oligomer a molecular weight of not more than about 6,000 daltons, preferably not more than about 5,000 daltons, and more preferably not more than about 4,000 daltons. Such polyether polyols include but are not limited to polymethylene oxide, polyethylene oxide, polypropylene oxide, polybutylene oxide, and mixtures thereof.

Representative hydrocarbon polyols which may be used include, but are not limited to, those based on a linear or branched hydrocarbon polymer having a molecular weight of from 600 to 4,000, such as fully or partially hydrogenated 1,2-polybutadiene, 1,2-polybutadiene hydrogenated to an iodine number of from 9 to 21; and fully or partially hydrogenated polyisobutylene. Unsaturated hydrocarbon polyols are not preferred because the oligomers made from them, when cured, are susceptible to oxidation. Representative polycarbonate polyols include but are not limited to the reaction products of dialkyl carbonate with an alkylene diol, optionally copolymerized with alkylene ether diols.

The polyisocyanate component is preferably non-aromatic as oligomers based on aromatic polyisocyanates often effect yellowing in the cured coating. Non-aromatic polyisocyanates of from 4 to 20 carbon atoms are preferably employed. Suitable saturated aliphatic polyisocyanates include but are not limited to isophorone diisocyanate; dicyclohexylmethane-4,4'-diisocyanate; 1,4-tetramethylene diisocyanate, 1,5-pentamethylene diisocyanate; 1,6-hexamethylene diisocyanate; 1,7-heptamethylene diisocyanate; 1,8-octamethylene diisocyanate, 1,9-nonamethylene diisocyanate, 1,10-decamethylene diisocyanate; 2,2,4-trimethyl-1,5-pentamethylene diisocyanate; 2,2'-dimethyl-1,5-pentamethylene diisocyanate; 3-methoxy-1,6-hexamethylene diisocyanate; 3-butoxy-1,6-hexamethylene diisocyanate; omega, omega'-dipropylether diisocyanate; 1,4-cyclohexyl diisocyanate; 1,3-cyclohexyl diisocyanate; trimethylhexamethylene diisocyanate; and mixtures thereof. Very small amounts of aromatic polyisocyanates may be used; however, long term stability on aging may suffer somewhat.

An end capping monomer is typically employed to provide at least one reactive acrylate or methacrylate terminal group on the oligomer. Suitable hydroxyl-terminated compounds which may be used as the end capping monomers include but are not limited to hydroxyalkyl acrylates or methacrylates such as hydroxyethyl acrylate, hydroxyethyl methacrylate, hydroxypropyl acrylate, hydroxypropyl methacrylate, hydroxybutyl acrylate, hydroxybutyl methacrylate, and so forth. A particularly preferred end capping monomer is hydroxyethyl acrylate or hydroxyethyl methacrylate.

Some commercially available aliphatic urethane acrylate and methacrylate oligomers which are suitable for use in this invention include, but are not limited, to the following:

1. PHOTOMER® 6008 from Henkel Corporation, Ambler, Pa., which comprises aliphatic urethane acrylate oligomer from polyether polyol, dicyclohexyl methane diisocyanate, and hydroxyethyl acrylate. The oligomer has a number average molecular weight of about 1,500 daltons and is sold as a solution of the oligomer in tripropylene glycol diacrylate as diluent.

2. PHOTOMER® 6019, also from Henkel Corporation, completely analogous to the above but based on isopherone diisocyanate rather than dicyclohexyl methane diisocyanate.

3. EBECRYL 270, from UCB Chemicals, Smyrna, Ga., which comprises an aliphatic urethane diacrylate based on a polyether polyol.

4. PURELAST® aliphatic urethane acrylate oligomers based on polyether backbones, available from Polymer Systems Corporation, Orlando, Fla. Suitable PURELAST® oligomers include 534, 536, and 538 (trifunctional polyether urethane acrylates), and 544, 546 and 548 (tetrafunctional polyether urethane acrylates). Additional oligomers include 566, 566A, 569, 569A, 586, 586A, 590, 590A, 595, 595A, 597, 597A, 598 and 598A. These oligomers increase in modulus with increasing number in the series and are either difunctional (no suffix) or monofunctional ("A" suffix). All of these oligomers are sold neat, except for 597A and 598A, which include 7% and 10% isobornyl acrylate, respectively. Particularly preferred from this group are PURELAST® 590 and 595. Methacrylate analogs of these oligomers are suitable as well.

The second component (b) of the radiation curable compositions from which the matrix material are formed comprises reactive unsaturated monomer. While the inventors do not intend to be limited by theory, it is believed that the reactive unsaturated monomer contributes to the desired combination of maximum tensile strength and elongation. In a preferred embodiment, the reactive unsaturated monomer comprises acrylate or methacrylate monomer or a mixture thereof, alone or in combination with other unsaturated monomers. In further preferred embodiments, the reactive unsaturated monomer comprises a mixture of at least two reactive monomers, and more preferably comprises at least two monomers selected from the group consisting of (i) cross-linking monomers, (ii) hydrogen-bonding monomers, and (iii) monofunctional steric-hindrance monomers. It has been discovered that combinations of these types of monomers can contribute to the desired combination of high temperature maximum tensile strength and elongation suitable to provide, in turn, the optical fiber ribbon having improved heat strippability. In further preferred embodiments, the reactive monomer mixture comprises a mixture of at least one of (i) the cross-linking monomer and (ii) the hydrogen-bonding monomer, and further comprises (iii) the monofunctional steric-hindrance monomer. Combinations of either the cross-linking monomer and/or the hydrogen-bonding monomer with the monofunctional steric-hindrance monomer are particularly advantageous for providing the desired combination of high temperature maximum tensile strength and elongation.

Unsaturated cross-linking monomers are known in the art and may comprise from 2 to about 5, or more, functional groups. Acrylate and methacrylate, and particularly trifunctional acrylate and methacrylate cross-linking monomers are preferred. Examples of suitable cross-linking monomers include, but are not limited to, trimethyloyl propane triacrylate, alkoxylated derivatives thereof, glycerol alkoxytriacrylates, pentaerythritol-containing acrylates such as pentaerythritol tetraacrylate and dipentaerythritol monohydroxypentacrylate, neopentyl glycol diacrylate, isocyanurate di- and triacrylate components, bisphenol-A diacrylates and dimethacrylates, alkoxylated derivatives thereof, melamine acrylate and methacrylate derivatives, polyether acrylates and methacrylates, dicylcopentyloxyethyl diacrylate, dicyclopentyloxyethyl dimethacrylate, cyclohexane dimethanol diacrylates, and the like, and mixtures thereof. In a further preferred embodiment, the cross-linking monomer comprises an isocyanurate monomer. More preferably, the cross-linking monomer comprises a triacrylate or a trimethacrylate of an isocyanurate compound. Trifunctional monomers, and particularly a triacrylate of trishydroxyethyl isocyanurate, are preferred cross-linking monomers.

Unsaturated hydrogen-bonding monomers are also known in the art and generally include a high degree of hydrogen bonding. Examples of hydrogen-bonding monomers include, but are not limited to, urethane monoacrylates, including, but not limited to, those resulting from reaction of a hydroxy alkyl acrylate and an isocyanate, for example the reaction products of hydroxypropyl acrylate and phenyl isocyanate, hydroxyethyl acrylate and butyl isocyanate, and the like. Hydrophilic monomers such as N-vinyl formamide, N-vinyl-2-caprolactam and the like are also suitable.

Finally, monofunctional unsaturated steric hindrance monomers are also known in the art and are suitable for use in the radiation curable compositions. Examples include, but are not limited to isobornyl acrylate, isobornyl methacrylate, dicyclopentyloxyethyl acrylate, dicyclopentyloxyethyl methacrylate, tert-butyl-cyclohexyl acrylates and methacrylates, alkoxylated derivatives thereof, and mixtures thereof.

As set forth above, it is preferred that the reactive monomer mixture comprises a mixture of at least one of (i) the cross-linking monomer and (ii) the hydrogen-bonding monomer, and further comprises (iii) the monofunctional steric-hindrance monomer. In such embodiments, it is further preferred that the monofunctional steric hindrance monomer comprises at least about 20 percent by weight of the reactive monomer mixture, and more preferably at least about 30 weight percent of the reactive monomer mixture, to provide the necessary elongation to the cured compositions.

An optional component of the matrix composition is a photoinitiator. The necessity for this component depends on the envisioned mode of cure of the matrix composition: if it is to be ultraviolet cured, a photoinitiator is needed; if it is to be cured by an electron beam, the material may comprise no or substantially no photoinitiator. In the ultraviolet cure embodiment, the photoinitiator, when used in a small but effective amount to promote radiation cure, must provide reasonable cure speed without causing premature gelation of the matrix composition. Further, it must not interfere with the optical clarity of the cured matrix material. Still further, the photoinitiator must itself be thermally stable, non-yellowing, and efficient. Suitable photoinitiators include, but are not limited to, hydroxycyclohexylphenyl ketone; hydroxymethylphenylpropanone; dimethoxyphenylacetophenone; 2-methyl-1-[4-(methylthio)phenyl]-2-morpholinopropanone-1; 1-(4-isopropylphenyl)-2-hydroxy-2-methylpropan-1-one; 1-(4-dodecylphenyl)-2-hydroxy-2-methylpropan-1-one; (4-(2-hydroxyethoxy)phenyl-(2-hydroxy-2-propyl)ketone; diethoxyacetophenone; 2,2-di-sec-butoxyacetophenone; diethoxy-phenyl acetophenone; bis(2,6-dimethoxybenzoyl)-2,4,4-trimethylpentylphosphine oxide; 2,4,6-trimethylbenzoyldiphenylphosphine oxide, 2,4,6-trimethylbenzoylethoxyphenylphosphine oxide; and mixtures of these. A particularly preferred photoinitiator is hydroxycyclohexylphenyl ketone, such as is supplied by Ciba Specialty Chemicals, Tanytown, N.Y., as IRGACURE® 184.

The amounts of the respective components in the radiation curable compositions may be varied as suitable to obtain the recited maximum tensile strength and elongation, in combination with other desired physical and chemical properties for the matrix material. Preferably, the radiation curable compositions comprise, by weight, from about 30% to about 80% of the urethane acrylate oligomer, from about 10% to about 60% of the reactive unsaturated monomer, and from about 0.1% to about 10% of the photoinitiator. More preferably, the radiation curable compositions comprise, by weight, from about 40% to about 80% of the urethane acrylate oligomer, from about 10% to about 50% of the reactive unsaturated monomer, and from about 1% to about 10% of the photoinitiator. Even further preferred are radiation curable compositions comprising, by weight, from about 40% to about 70% of the urethane acrylate oligomer, from about 30% to about 60% of the reactive unsaturated monomer, and from about 1% to about 6% of the photoinitiator.

The matrix material may also comprise one or more optional conventional ingredients. One optional class of components includes various stabilizers or antioxidants. To improve shelf life (storage stability) of the uncured coating, as well as to increase thermal and oxidative stability of the cured coating, one or more stabilizers or antioxidants may be included in the composition. Examples of suitable stabilizers include organic phosphites; hindered phenols; mixtures thereof; and the like. Some particular examples of antioxidants which can be used include propionates such as octadecyl-3-(3',5'-di-tert-butyl-4'-hydroxyphenyl) propionate and hydrocinnamates such as thiodiethylene bis (3,5-di-tert-butyl-4-hydroxy)hydrocinnamate and tetrakis [methylene(3,5-di-tert-butyl-4-hydroxyhydrocinnamate)] methane. When a stabilizer or antioxidant is used, it may be incorporated in an amount, for example, of from about 0.1 percent to about 2.0 percent by weight, based on the weight of the composition. Preferably, it is included in the range from about 0.5 percent to about 1.5 percent by weight, based on the weight of the composition. Desirable properties of a stabilizer or antioxidant include non-migration. A preferred antioxidant is thiodiethylene bis(3,5-di-tert-butyl4'-hydroxy)hydrocinnamate, such as IRGANOX® 1035, from Ciba Specialty Chemicals, Tanytown, N.Y.

Additional optional components for use in the radiation curable compositions include additives for reducing the coefficient of friction of the cured compositions and/or for improving the release of the cured compositions from the optical fibers at room temperature, i.e. improving the peelability of the cured compositions. Such additives are known in the art and may include, but are not limited to, silicone materials, including silicone acrylates and silicone methacrylates, fluorocarbons and the like.

The optical fiber ribbons are manufactured in accordance with conventional processing techniques. A plurality of inked and coated optical fibers are typically embedded and secured in a desired configuration, e.g., in a parallel and planar or other prescribed arrangement, in the liquid radiation curable matrix composition. The inked and coated optical fibers are disposed in a desired relationship to each other, to form a unitary structure, which structure is produced by arranging the fibers in the desired relationship, applying the liquid matrix composition to the fibers to embed them therein, then curing the liquid composition by exposure to curing radiation. A high focus lamp is typically employed for curing although other conventional apparatus and procedures may be employed. The matrix composition, when cured, adheres to the ink or outer coating layer of the fibers during use and provides for a coating structure which is easily and cleanly heat strippable therefrom, preferably in an intact unit, without substantially damaging the integrity of the optical fibers.

Although the radiation-cured matrix materials have been discussed herein for use in optical fiber ribbons, one of ordinary skill in the art will appreciate that these compositions may be useful in any embodiment where it is desirable to coat or bind a flexible substrate. Examples of such substrates include, but are not limited to, glass, metal or plastic.

The following example exemplifies specific embodiments of the matrix materials and optical fiber ribbons of the present invention. Throughout the example and the present specification, parts and percentages are by weight unless otherwise specified.

EXAMPLE

In this example, radiation curable compositions A and B are prepared comprising about 45 parts by weight of a polyether aliphatic urethane diacrylate supplied under the commercial designation Purelast® 595, about 4 parts by weight of a photoinitiator comprising 1-hydroxycyclohexyl phenyl ketone supplied under the commercial designation Irgacure® 184, about 1 part by weight of an antioxidant comprising Irganox® 1035, and reactive unsaturated monomer mixtures. In composition A, the reactive monomer mixture comprises 25 parts by weight of triacrylate trishydroxyethyl isocyanurate supplied under the commercial designation Sartomer SR-368 and 25 parts by weight of isobornyl acrylate (IBOA). In composition B, the reactive monomer mixture comprises 20 parts by weight of the triacrylate trishydroxyethyl isocyanurate supplied under the commercial designation Sartomer SR-368, 20 parts by weight of isobornyl acrylate (IBOA), and 10 parts by weight N-vinyl formamide (NVF).

The compositions are cured by exposure to ultraviolet radiation (0.7 joules/cm$^2$) at a temperature of about 70° C. using a medium pressure mercury vapor lamp and are subjected to measurement of maximum tensile strength and elongation at 100° C. according to ASTM D-882-95a. The compositions and the properties (as an average of 3 measurements) are set forth in the Table.

For comparison purposes, a comparative composition C is also subjected to similar measurements. The comparative composition C comprises about 65 parts by weight of a polyether aliphatic urethane acrylate supplied under the commercial designation Photomer 6008, about 4 parts by weight of the photoinitiator Irgacure® 184, about 1 part by weight of the antioxidant Irganox® 1035, and reactive monomer mixture. In composition C, the reactive monomer mixture comprises 25 parts by weight of 2-phenoxyethyl acrylate (PEA) and 5 parts by weight of hexanediol diacrylate (HDODA). The composition and the properties (as an average of 3 measurements) are also set forth in the Table.

TABLE

| Component (parts by weight) | A | B | C |
| --- | --- | --- | --- |
| Urethane Acrylate Oligomer | | | |
| PE 595 | 45 | 45 | — |
| Ph 6008 | — | — | 65 |
| Reactive Monomer | | | |
| SR-368 | 25 | 20 | 00 |
| IBOA | 25 | 20 | — |
| NVF | — | 10 | — |
| PEA | — | — | 25 |
| HDODA | — | — | 5 |
| Photoinitiator (Irgacure ® 184) | 4 | 4 | 4 |
| Antioxidant (Irganox ® 1035) | 1 | 1 | 1 |
| Property | | | |
| Maximum Tensile Strength, 100° C., psi | 1208 | 3113 | 410 |
| Elongation, 100° C., % | 31.6 | 53.0 | 13 |

The cured compositions A and B exhibit the desired combination of maximum tensile strength and elongation, while the comparative composition C is deficient in both of these properties.

The present examples and specific embodiments set forth in the present specification are provided to illustrate various embodiments of the invention and are not intended to be limiting thereof. Additional embodiments within the scope of the present claims will be apparent to one of ordinary skill in the art.

What is claimed is:

1. Optical fiber ribbon, comprising at least two optical fibers and a matrix material in which the optical fibers are encapsulated, the matrix material exhibiting a maximum tensile strength at 100° C. of at least about 1000 psi and an elongation at break at 100° C. of at least about 15%.

2. Optical fiber ribbon as defined by claim 1, wherein the matrix material exhibits a maximum tensile strength at 100° C. of at least about 2000 psi.

3. Optical fiber ribbon as defined by claim 1, wherein the matrix material exhibits a maximum tensile strength at 100° C. of at least about 3000 psi.

4. Optical fiber ribbon as defined by claim 1, wherein the matrix material exhibits an elongation at break at 100° C. of at least about 30%.

5. Optical fiber ribbon as defined by claim 2, wherein the matrix material exhibits an elongation at break at 100° C. of at least about 30%.

6. Optical fiber ribbon as defined by claim 1, wherein the matrix material exhibits an elongation at break at 100° C. of at least about 40%.

7. Optical fiber ribbon as defined by claim 3, wherein the matrix material exhibits a n elongation at break at 100° C. of at least about 40%.

8. Optical fiber ribbon as defined by claim 1, wherein the matrix material and any underlying coatings are strippable from the optical fibers in an intact unit when the optical fiber ribbon is heated to about 90° C.–110° C.

9. Optical fiber ribbon as defined by claim 1, wherein at least four optical fibers are encased within the matrix material.

10. Optical fiber ribbon as defined by claim 1, wherein the matrix material is formed by curing a radiation curable composition comprising (a) aliphatic urethane oligomer having acrylate or methacrylate functionality, (b) reactive unsaturated monomer, and, optionally, (c) a photoinitiator.

11. Optical fiber ribbon as defined by claim 10, wherein the reactive unsaturated monomer (b) comprises a mixture of at least two reactive unsaturated monomers.

12. Optical fiber ribbon as defined by claim 11, wherein the reactive unsaturated monomer mixture comprises at least one acrylate or methacrylate monomer.

13. Optical fiber ribbon as defined by claim 12, wherein the reactive unsaturated monomer mixture comprises at least two monomers selected from the group consisting of (i) cross-linking monomers, (ii) hydrogen-bonding monomers, and (iii) monofunctional steric-hindrance monomers.

14. An optical fiber matrix as defined by claim 13, wherein the cross-linking monomer comprises a triacrylate or trimethacrylate.

15. An optical fiber ribbon as defined by claim 10, wherein the radiation curable composition comprises, by weight, from about 30% to about 80% of the urethane acrylate oligomer, from about 10% to about 60% of the reactive unsaturated monomer, and from about 0.1% to about 10% of the photoinitiator.

16. An optical fiber ribbon as defined by claim 10, wherein the radiation curable composition comprises, by weight, from about 40% to about 80% of the urethane acrylate oligomer, from about 10% to about 50% of the reactive unsaturated monomer, and from about 1% to about 10% of the photoinitiator.

17. An optical fiber ribbon as defined by claim 10, wherein the radiation curable composition comprises, by weight, from about 40% to about 70% of the urethane acrylate oligomer, from about 30% to about 60% of the reactive unsaturated monomer, and from about 1% to about 6% of the photoinitiator.

18. An optical fiber ribbon as defined by claim 13, wherein the reactive unsaturated monomer mixture comprises a mixture of at least one of (i) cross-linking monomer and (ii) hydrogen-bonding monomer, and further comprises (iii) monofunctional steric-hindrance monomer.

19. A radiation cured material having a maximum tensile strength at 100° C. of at least about 1000 psi and an elongation at break at 100° C. of at least about 15% and formed from a radiation curable composition comprising (a) aliphatic urethane oligomer having acrylate or methacrylate functionality, (b) reactive unsaturated monomer, and, optionally, (c) a photoinitiator.

* * * * *